(12) United States Patent
Gerstenkorn

(10) Patent No.: US 9,607,456 B2
(45) Date of Patent: Mar. 28, 2017

(54) METHOD AND SYSTEM FOR OPERATING ELECTRICAL CONSUMERS IN A BUILDING

(71) Applicant: Inventio AG, Hergiswil (CH)

(72) Inventor: Bernhard Gerstenkorn, Ebikon (CH)

(73) Assignee: Inventio AG, Hergiswil (CH)

( * ) Notice: Subject to any disclaimer, the term of this patent is extended or adjusted under 35 U.S.C. 154(b) by 35 days.

(21) Appl. No.: 14/173,926

(22) Filed: Feb. 6, 2014

(65) Prior Publication Data

US 2014/0152819 A1 Jun. 5, 2014

Related U.S. Application Data

(63) Continuation of application No. 12/990,025, filed as application No. PCT/EP2008/055197 on Apr. 28, 2008, now Pat. No. 8,688,284.

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G07C 9/00 | (2006.01) |
| G05B 19/042 | (2006.01) |
| H04L 12/12 | (2006.01) |

(52) U.S. Cl.
CPC ..... *G07C 9/00007* (2013.01); *G05B 19/0428* (2013.01); *G05B 2219/24168* (2013.01); *H04L 12/12* (2013.01)

(58) Field of Classification Search
CPC ... H02J 3/14; G07C 9/00007; G05B 19/0428; G05B 2219/24168; H04L 12/12

USPC .................................................. 700/295, 297
See application file for complete search history.

(56) References Cited

U.S. PATENT DOCUMENTS

| | | |
|---|---|---|
| 4,023,139 A | 5/1977 | Samburg |
| 4,149,614 A | 4/1979 | Mandel et al. |
| 5,387,768 A | 2/1995 | Izard et al. |
| 5,923,363 A | 7/1999 | Elberbaum |
| 6,597,389 B2 | 7/2003 | Tanaka et al. |
| 6,774,936 B1 | 8/2004 | Park |
| 6,869,014 B2 | 3/2005 | Gerstenkorn |
| 7,263,073 B2 | 8/2007 | Petite et al. |
| 7,634,555 B1 | 12/2009 | Wainscott et al. |
| 7,855,639 B2 | 12/2010 | Patel et al. |
| 8,125,329 B1 | 2/2012 | Hirou |
| 8,688,284 B2 | 4/2014 | Gerstenkorn |
| 8,866,586 B2 * | 10/2014 | Hayashi ........................ 340/5.81 |
| 2002/0012323 A1 | 1/2002 | Petite et al. |
| 2005/0138385 A1 * | 6/2005 | Friedli et al. ................. 713/182 |

(Continued)

FOREIGN PATENT DOCUMENTS

| | | |
|---|---|---|
| DE | 4425876 A1 | 1/1996 |
| EP | 1868132 A1 | 12/2007 |

*Primary Examiner* — Ziaul Karim
(74) *Attorney, Agent, or Firm* — Fraser Clemens Martin & Miller LLC; William J. Clemens

(57) ABSTRACT

A method and a system are provided for switching at least one electrical consumer in a building comprising an elevator system. The switched electrical consumer is, for example, a camera. The camera is activated if when using the elevator system the user does not actuate a building door within an ascertained route time, i.e. the user does not arrive at his/her destination. It is possible using an image recorded by the camera to establish whether the user is possibly in a dangerous situation.

16 Claims, 8 Drawing Sheets

(56) References Cited

U.S. PATENT DOCUMENTS

| | | | |
|---|---|---|---|
| 2005/0190053 A1* | 9/2005 | Dione ........................... | 340/500 |
| 2007/0262857 A1 | 11/2007 | Jackson | |
| 2008/0195257 A1* | 8/2008 | Rauch ..................... | B61B 1/02 |
| | | | 701/1 |
| 2008/0208401 A1* | 8/2008 | Kumar .................. | B61L 3/006 |
| | | | 701/19 |
| 2009/0189736 A1* | 7/2009 | Hayashi ................. | G06F 21/32 |
| | | | 340/5.81 |
| 2009/0195401 A1* | 8/2009 | Maroney et al. .......... | 340/686.6 |
| 2009/0234521 A1* | 9/2009 | Kumar ................ | B60L 11/1851 |
| | | | 701/19 |

* cited by examiner

METHOD AND SYSTEM FOR OPERATING ELECTRICAL CONSUMERS IN A BUILDING

CROSS-REFERENCE TO RELATED APPLICATIONS

This application is a continuation of the co-pending U.S. patent application Ser. No. 12/990,025 filed Oct. 28, 2010.

FIELD OF THE INVENTION

The invention relates to a method for switching at least one electrical consumer in a building comprising an elevator system.

BACKGROUND OF THE INVENTION

It is known in building systems technology to use switches to switch electrical consumers. For this purpose, at least one power contact of a building power network is switched to the electrical consumer. For example, an electric lighting unit in the building is switched on, or off or dimmed by means of a manual switch.

DE 44 258 76 A1 demonstrates a power outlet with an integrated network node and a current supply of the network node with the aim of increasing the functionality. The network node communicates via a building power network in a bus system and, in response to commands from a higher level control center, switches a relay in the power outlet. Electrical consumers connected to the power outlet are thus switched by the central control. The building power network serves both to supply the electrical consumers with electrical current and also to allow the network node and the control center to communicate with each other via the bus system.

With the aim of providing an uncomplicated communications standard which can be adapted to suit the most varied conditions, the short-range communications standard ZigBee (IEEE 802.15.4) has been developed in accordance with http://standards.ieee.org/getieee802/download/802.15.4-2003.pdf. According to this short-range communications standard ZigBee (IEEE 802.15.4) a command is transmitted to switch the electrical consumer via a radio network which is separate from the building power network. It is true that only small quantities of data from 20 to 250 Kb/s can be transmitted over short distances of less than 300 meters, but in view of the teaching of DE 44 258 76 A1 the short-range communication has the advantage that temporal and local changes in the impedance behavior of the building power network cannot lead to disruptions to communications.

SUMMARY OF THE INVENTION

An object of the present invention is to develop further the switching of electrical consumers in a building.

The electrical consumer is supplied with electrical current from at least one electrical current supply. At least one power contact from the electrical current supply to the electrical consumer is switched by means of at least one switch. The electrical consumer and the switch are controlled from at least one network node. Such a network node receives in at least one radio network at least one control signal. The process of switching a consumer commences, so that an identity of at least one user is detected from at least one identification sensor and at least one identification sensor signal is generated as a control signal for a detected identity of a user. The identification sensor signal is transmitted from the identification sensor via at least one network node in the radio network.

At least one destination signal is generated for a transmitted identification sensor signal. At least one door in the building and a route time from the identification sensor generating the identification sensor signal to the building door designated by the destination signal is ascertained for a generated destination signal. Subsequently, a check is performed to establish whether a door sensor signal of a door sensor of the building door designated by the destination signal is transmitted prior to the route time expiring. In the event that such a door sensor signal is not transmitted, at least one electrical consumer, for example a camera, is ascertained on the route from the identification sensor generating the identification sensor signal to the building door designated by the destination signal. At least one activation signal is generated for the ascertained electrical consumer and a network address of a network node of a switch of the electrical consumer is ascertained. The generated activation signal and the ascertained network address of the network node are transmitted to a network node of the ascertained electrical consumer, from where the generated activation signal is transmitted to the ascertained network address of the first network node of the switch. The third electrical consumer is switched to "ON" by the switch by virtue of the activation signal. If the third electrical consumer is, for example, a camera, then this records at least one image of the route from the identification sensor generating the identification sensor signal to the building door designated by the destination signal. The recorded image is transmitted from the third electrical consumer via one or a plurality of network nodes to a control device and/or via a network to a remote control center.

At least one reference image of a user which has been generated in advance is prepared advantageously for the identification sensor signal. The transmitted image is compared with the reference image. In the event that the user on the transmitted image is recognized, it is ascertained whether the user is in a dangerous situation. In the event that the user is in a dangerous situation, an alarm signal is generated.

The alarm signal and a position indicator of the identification sensor, which has generated the identification sensor signal, and/or a position indicator of the third electrical consumer which has recorded the image is transmitted advantageously to at least one remote control center and/or to a building security system. At least one safety officer is assigned to the denoted site of the identification sensor or to the denoted site of the third electrical consumer.

A door sensor detects whether at least one building door is opened or closed and if it detects that a door is opened or closed, it generates at least one door sensor signal as a control signal, wherein the door sensor signal can be used to indicate whether the building door is opened or closed from a side remote from at least one first electrical consumer and/or whether the building door has been opened or closed from a side facing the first electrical consumer. This has the advantage that the door sensor signal indicates the direction in which a user is moving in the building and as a result it is possible to ascertain in a more convenient manner the electrical consumers to be switched.

The door sensor signal indicates "ON" if a building door has been opened or closed from a side remote from the first electrical consumer. Accordingly, the door sensor signal indicates "OFF" or "DIM", if a building door is opened or closed from a side facing the first electrical consumer.

If a control signal is transmitted via at least one second network node directly to the first network node or via the second network node to at least one third network node and from the third network node to at least one control device, this has the advantage that a control signal is either converted directly at a first network node or is prepared in advance by a control device. It is practical to transmit the control signal directly to the first network node of this first or second electrical consumer, especially if a single first or second electrical consumer is to be switched.

At least one first electrical consumer is ascertained advantageously for a transmitted control signal. A network address of a first network node of a switch of the first electrical consumer is ascertained for the ascertained first electrical consumer. The transmitted control signal and the ascertained network address of the first network node are transmitted to the third network node. The transmitted control signal is transmitted from the third network node to the ascertained network address of the first network node.

This has the advantage that the control device can ascertain for a control signal a plurality of first electrical consumers and allocated first network nodes.

At least one destination signal which designates a building door is advantageously designated for a transmitted door sensor signal. At least one first electrical consumer is ascertained for a generated destination signal on the path from the door sensor generating the door sensor signal to the building door designated by the destination signal. A network address of a first network node of a switch of the first electrical consumer is ascertained for each ascertained first electrical consumer. The transmitted door sensor signal and the ascertained network address of the first network node are transmitted to the third network node. The transmitted door sensor signal is transmitted from the third network node to the ascertained network address of the first network node. This has the advantage that the control device for a door sensor signal generates a destination signal and thus ascertains a route from the door sensor generating the door sensor signal to the building door in the building as designated by the destination signal. It is thus possible to allocate an access door to the building permanently to a door sensor signal of an access door to an apartment as a destination signal. As the user leaves the apartment, all the first electrical consumers as far as the access door to the building are subsequently switched on automatically.

At least one access authorization of a user to a building area is advantageously checked for a transmitted identification sensor signal. In the event that an access authorization of the user to a building area is available for a transmitted identification sensor signal, at least one first electrical consumer in the building area is ascertained. At least one control signal is generated for the ascertained first electrical consumer and a network address of a first network node of a switch of the first electrical consumer is ascertained. The generated control signal and the ascertained network address of the first network node are transmitted to the third network node. The generated control signal is transmitted from the third network node to the ascertained network address of the first network node.

This provides the particular advantage that a first electrical consumer, i.e. for example an electric lighting unit, in the building area being monitored for access is switched only for users with access authorization.

At least one destination request signal which designates a destination floor level is generated advantageously for a transmitted identification sensor signal. The destination request signal is transmitted to at least one elevator control device and at least one user is transported in at least one elevator cabin in accordance with this destination request signal to the destination floor level. At least one first electrical consumer on the destination floor level is ascertained. At least one control signal is generated for the ascertained first electrical consumer and a network address of a first network node of a switch of the first electrical consumer is ascertained. The generated control signal and the ascertained network address of the first network node are transmitted to the third network node. The generated control signal is transmitted from the third network node to the ascertained network address of the first network node.

This is advantageous since, as a consequence, a destination request for an elevator system is automatically generated by the identification sensor signal. Thus, it is possible to permanently pre-define a destination floor level for a user, for whom an identification sensor on a starting floor level generates an identification sensor signal. For example, an identified user is automatically transported in the mornings from the starting floor level in the multi-story car park to his office on the destination floor level.

The above mentioned object is also achieved using a computer program product having at least one computer program means which is suitable for implementing the method for switching at least one electrical consumer by virtue of the fact that at least one of the method steps mentioned above or explained below is performed, if the computer program means is loaded into a processor at least of one network node or a control device or a remote control center.

DESCRIPTION OF THE DRAWINGS

Exemplified embodiments of the invention are explained in detail with reference to the figures in which.

DESCRIPTION OF PREFERRED EMBODIMENTS

FIGS. 2 to 9 show exemplified embodiments of an electrical consumer of the invention. In accordance with FIGS. 2 to 4, a first electrical consumer 1 in the embodiment of an electric lighting unit is switched by means of a sensor 6 in an embodiment of a door sensor 6 or by means of a sensor in an embodiment of an identification sensor 6'. In accordance with FIGS. 5 to 7 a second electrical consumer 1' in the embodiment of a door opening mechanism is switched by means of an identification sensor 6'. In accordance with FIGS. 8 and 9, a third electrical consumer 1" in the embodiment of a camera is switched by means of a door sensor 6.

The electrical consumer 1, 1', 1" is located in a building G. The building G comprises at least one zone, the zone can be mobile or stationary, the building G can also comprise a plurality of apportioned zones. Thus, the building G can be quite easily a mobile zone such as a motor vehicle, a caravan, a wagon, an elevator car, etc., or the building G can be a stationary zone such as a house, an office block, a high-rise building, a hospital, etc., or the building G can be a plurality of apportioned zones such as a building campus, an airport, an exhibition center, etc.

Figure 10:
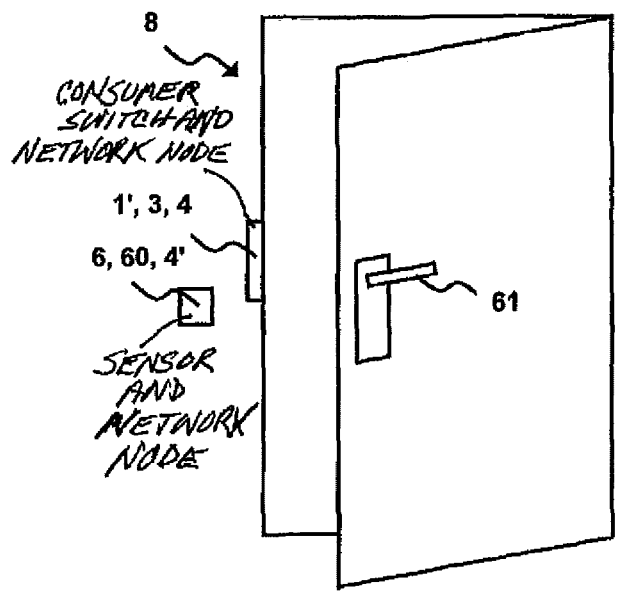
FIG. 10 shows a schematic illustration of a part of a first exemplified embodiment of a building door having a door sensor for an electrical consumer in accordance with FIGS. 2 to 9.
Figure 11:
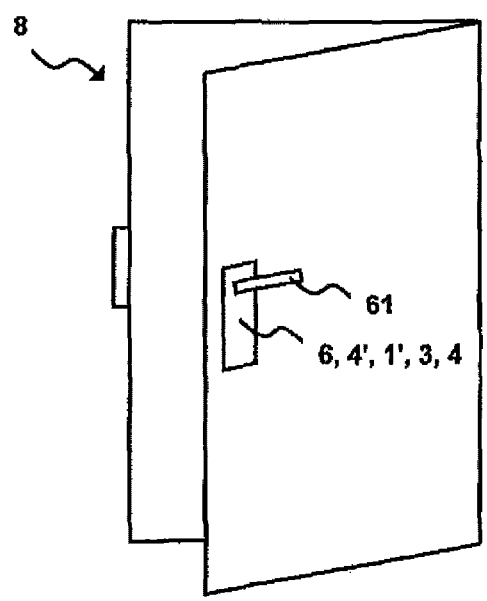
FIG. 11 shows a schematic illustration of a part of a second exemplified embodiment of a building door having a door sensor for an electrical consumer in accordance with FIGS. 2 to 9.

The building G comprises at least one building door 8 (FIG. 10). The building door 8 is an access door to an apartment in the building G and/or an access door to the building G. In accordance with FIGS. 10 and 11 the building door 8 comprises at least one door leaf and a door frame. The door leaf comprises a door trim with door handle 61 and door latch. The door frame comprises a lock plate.

Figure 1:
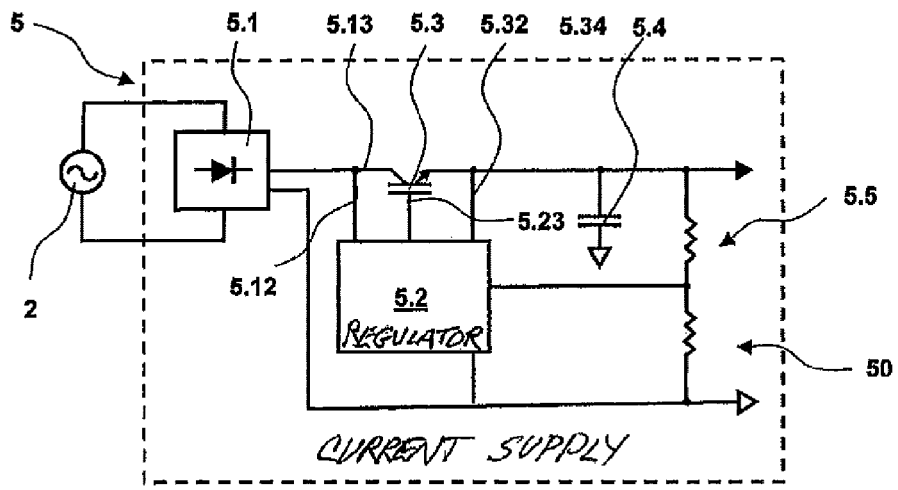
FIG. 1 shows a schematic illustration of a part of an exemplified embodiment of a first electrical current supply of a first network node for switching an electrical consumer.

The building G comprises at least one building power network 2 (FIG. 1). This is an electricity supply to the building G and thus also the electrical consumers 1, 1', 1" in building G comprising electrical current, e.g. 220 VAC AC, 380 VAC rotary current or in the low voltage range 24 VDC or 42 VDC, etc.

Figure 15:
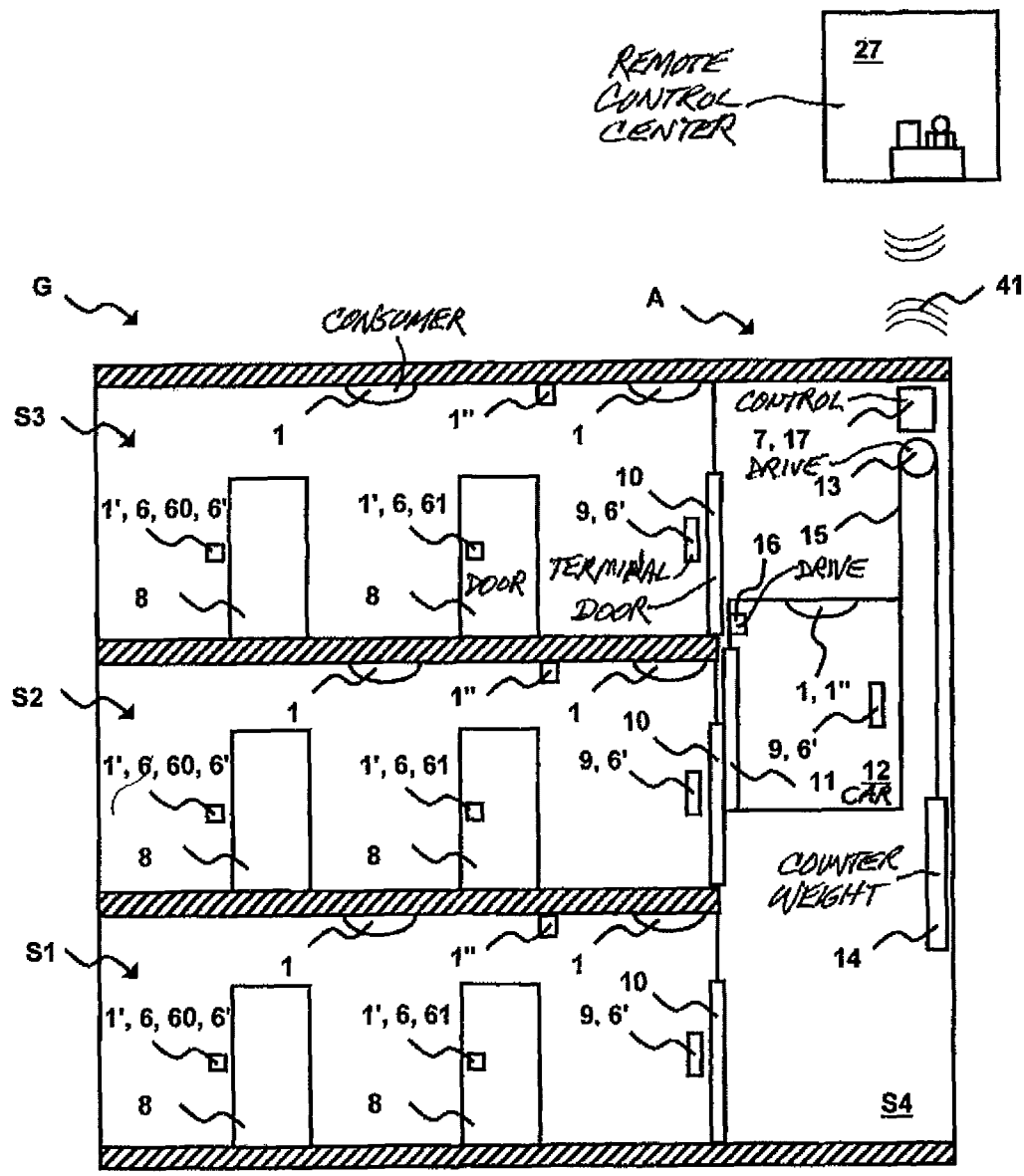
FIG. 15 shows a schematic illustration of a part of an exemplified embodiment of a building having electrical consumers in accordance with FIGS. 2 to 9 and sensors in accordance with FIGS. 10 to 13.

FIG. 15 shows an exemplified embodiment of a building G comprising a plurality of horizontal floor levels S1, S2, S3 and an elevator system A in a vertical elevator shaft S4. At least one elevator car 12 in the elevator shaft S4 is connected to a counter weight 14 via supporting means 15. The supporting means 15 is set in motion by an elevator drive 13 for the purpose of moving the elevator car 12 and the counter weight 14. A user has access to the elevator car 12 via an elevator door 10. An elevator door 10 on each floor level S1, S2, S3 forms the boundary between the floor levels S1, S2, S3 and the elevator shaft S4. The elevator door 10 is opened and closed via a door drive 16 which actuates a car door 11. Whilst an elevator car has stopped at a floor level, the car door 11 is mechanically coupled to the elevator doors 10, so that both the elevator car door 11 and the elevator doors 10 are opened and closed simultaneously. The building G can comprise more than three floor levels S1, S2, S3 and the elevator system A can comprise more than one elevator car 12 in an elevator shaft S4 or also a plurality of elevator cars 12 in a plurality of elevator shafts S4.

The user inputs a request for an elevator car 12 at a terminal 9. The request can be a request for a floor level, an elevator car request or a destination request. The terminal 9 transmits the request via a signal line to an elevator control 17. In the case of a floor level request, the elevator car 12 is moved to the starting floor level, where the user has made a floor level request, whereupon the user in the elevator car 12 makes an elevator car request to a destination floor level. In the case of a destination request the user on a starting floor level makes a combined floor level request and elevator car request, in that he/she merely inputs the destination floor level. The elevator car 12 is moved to the starting floor level and the user does not have to make any further elevator car request in the elevator car 12 in order to be transported to the destination floor level.

Figures 12, 13:
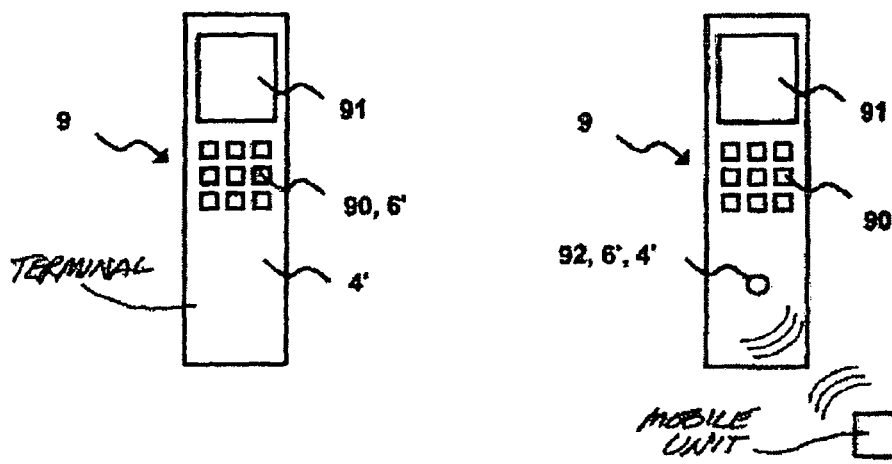
FIG. 12 shows a schematic illustration of a part of a first exemplified embodiment of an identification sensor for an electrical consumer in accordance with FIGS. 2 to 9.
FIG. 13 shows a schematic illustration of a part of a second exemplified embodiment of an identification sensor for an electrical consumer in accordance with FIGS. 2 to 9.

In accordance with FIGS. 12 and 13, the terminal 9 comprises at least one stationary request input device 90 in the embodiment of a key pad and/or at least one stationary recognition device 92 for the purpose of making the request. The user makes a request manually on the stationary request input device 90, in that he presses at least one key. For example, the user inputs a destination request manually as a number sequence on the key pad. The user receives on a stationary output device 91 an optical and/or acoustical confirmation of the destination request made. The key pad can also be a touch-sensitive screen. The stationary recognition device 92 comprises a transmission and receiving unit for an electro-magnetic field and communicates via a radio frequency with at least one mobile request input device 95 located with the user. The mobile request input device 95 is, for example, a radio frequency identification card (RFID). The recognition device 92 interacts in a manner known per se with the mobile request input device 95 for the purpose of receiving an identification code of the user. A pre-defined destination request is allocated to the identification code. The user receives on an output device 91 an optical and/or acoustic confirmation of the allocated destination request. The user can edit or delete the destination request on the stationary request input device 90.

The elevator control 17 (FIG. 15) can be disposed at any location in the building G. The elevator control 17 comprises at least one processor, at least one computer-readable data storage device and an electrical current supply. At least one computer program means is loaded out of the computer-readable data storage device into the processor and implemented. The computer program means controls the movement of the elevator car 12 by means of the elevator drive 13, the opening and closing of the elevator door 10 by means of the door drive 16 and the switching of an electrical consumer 1 in the embodiment of an electric lighting unit in the elevator car 12. The elevator control 17 receives at least one request from the terminal 9 or from a control device 7.

Three embodiments of electrical consumers 1, 1', 1" will be explained hereinunder:

The first electrical consumer 1 is, for example, an electric lighting unit. Known and tried and tested embodiments of an electric lighting unit are light bulbs, neon tubes, LED's, etc. In accordance with FIG. 15, an electric lighting unit is provided on each floor level S1, S2, S3 and in the elevator car 12. The electric lighting unit is switched by means of at least one switch 3. The switch 3 opens or closes or dims at least one power contact from the building power network 2 for electric lighting purposes. The electric lighting unit is supplied with an electrical current in accordance with FIG. 3 either directly by the building power network 2, for example, in the case of light bulbs, or in accordance with FIGS. 2 and 4 via an electrical current supply 51, for example, in the case of neon tubes and LED's.

The second electrical consumer 1' is, for example, a door opening mechanism of the building door 8. This mechanism comprises a locking bolt which can be moved between a locking position and an opening position by a motor. In accordance with FIG. 10, the motor and the locking bolt are installed in the lock plate of the door frame. In accordance with FIG. 11, the motor and the locking bolt are installed in the door trim of the door leaf. The motor is supplied with electrical current from an electrical current supply 51'. A switch 3 opens or closes a power contact from the building power network 2 to the current supply 51' of the door opening mechanism. In the case of door opening mechanisms which are actuated only occasionally, in accordance with FIG. 5, the electrical current supply 51' is energy self-sufficient, for example by means of accumulators, batteries, etc.

The third electrical consumer 1" is, for example, a camera, in particular comprising a digital image sensor. The camera records images in the spectrum of visible light. The camera can record both stationary and moving images. In accordance with FIG. 15, a camera is installed on each floor level S1, S2, S3 and in the elevator car 12. The camera is supplied with electrical current from an electrical current supply 51". A switch 3 opens or closes a power contact from the building power network 2 to the current supply 51" of the camera. For example, the camera is operated with an electrical direct current of 3 VDC. In accordance with FIG. 8, the electrical current supply 51" is supplied with electrical current by means of the building power network 2. In accordance with FIG. 9, the first network node 4 and the camera share a common electrical current supply 5, 51". It is also possible, as is the case with the electrical consumer 1' in FIG. 5 to install in an energy self-sufficient manner a camera which is actuated only occasionally.

At least two network nodes 4, 4', 4" communicate in the building G via at least one radio network 40. A known local radio network 40, such as Bluetooth (IEEE 802.15.1), ZigBee (IEEE 802.15.4) or WiFi (IEEE 802.11) can be used for this purpose. This communication is illustrated in FIGS. 2 to 9 by the three curved line symbol. The radio network 40 facilitates bi-directional communication in accordance with known and tried and tested network protocols such as the Transmission Control Protocol/Internet-Protocol (TCP/IP) or ZigBee Protocol.

A network node 4, 4', 4" (FIGS. 2 to FIG. 9) comprises a processor, a computer-readable data storage device and at least one antenna. At least one computer program means can be loaded from the data storage device into the processor. The computer program means controls the communication of the network node 4, 4', 4" via the antenna in the radio network 40. Each network node 4, 4', 4" has a substantially unique network address, for example, a Media Access Control (MAC) address or an Ethernet Hardware Address (EHA). The first network node 4 receives a control signal S, S'which is transmitted to it, and thus switches a switch 3. The switch 3 is, for example, a relay which can be controlled via at least one signal line from the first network node 4. The computer program means of the first network node 4 controls the switching of the switch 3. In accordance with FIGS. 2, 4, 6 and 8, the first network node 4 and the switch 3 can be physically separate, the switch 3 is, for example, a separate relay, contactor, etc. In accordance with FIGS. 3, 5, 7 and 9, the first network node 4 and the switch 3 are combined, for example, in such a way that the first network node 4 comprises an integrated relay, contactor or the like. The control signal S, S" is transmitted from a second or third network node 4', 4" to the first network node. The second network node 4' ascertains a control signal S, S', for example, on the basis of a signal received from a connected sensor 6, 6'. When using a third network node 4'", the control signal S, S' is not transmitted directly from the second to the first network node 4, 4' but rather initially from the second network node 4' to the third network node 4" and then from the third network node 4" to the first network node 4.

A plurality of electrical current supplies 5, 5', 5" supply the network nodes 4, 4', 4" or at least one sensor 6, 6' in the respective suitable manner with electrical current. A first network node 4 is supplied with electrical current from a first electrical current supply 5. A second network node 4' and a door sensor 6 or an identification sensor 6' are supplied with electrical current from a second electrical current supply 5'. A third network node 4" is supplied with electrical current from a third electrical current supply 5". The electrical current supplies can be supplied with electrical current from the building power network 2, however, they can also be energy self-sufficient.

The first electrical current supply 5 of the electrical network node 4 is permanently supplied with electrical current from at least one building power network 2. The first network node 4 which is supplied permanently with electrical current can therefore perform additional network-specific functions, such as routing, repeating, etc. This is of particular importance when the second network nodes 4' are, under certain circumstances not supplied permanently with electrical current from the building power network 2 and it is necessary to use routers or repeaters to forward the control signals S, S', which are transmitted from the second network nodes 4', for example, because the range of the radio network 40 in the building G is less than the distance to the receiver of the control signals S, S'. Thus, in accordance with FIGS. 4 to 9, the control signals S, S' are transmitted from the second network node 4' to the third network 4" of the control device 7. In the case of larger buildings G, this third network 4" can be located outside the range of the radio network 40. Depending upon the type of construction (cement, masonry, wood, etc.) of the building G, an effective range of a ZigBee radio network is only a few tens of meters.

FIG. 1 shows an example of embodiment of the first electrical current supply 5. At least one rectifier 5.1 delivers electrical current from the three-phase current side or alternating current side of the building power network 2 to a direct current side. The rectifier 5.1 is an uncontrolled rectifier with at least one diode. For example, the rectifier 5.1 comprises a bridge circuit or mid-point tapped circuit or one-way circuit. An electrical mixed voltage with an alternating voltage component and a direct voltage component is applied to the output of the rectifier 5.1. The ratio of the alternating voltage component and direct voltage component is termed ripple. The electrical mixed voltage pulsates with this ripple. The output of the rectifier 5.1 is connected with an input of at least one transistor 5.3 by way of an electrical conductor 5.13. The output of the rectifier 5.1 is connected with a first input of at least one switching regulator 5.2 by way of an electrical conductor 5.12. At least one output of the transistor 5.3 is connected with a second input of the switching regulator 5.2 by way of an electrical conductor 5.32. The switching regulator 5.2 controls the transistor 5.3 by way of a gate 5.23. The switched-on transistor 5.3 conducts electrical current of the rectifier 5.1 during a time window defined by threshold value. The transistor 5.3 is switched by way of the gate 5.23 to be electrically conductive as soon as the electrical mixed voltage at the first input of the switching regulator 5.2 drops below a freely definable first threshold value or as soon as the proportion, which is conducted through at the second input of the switching regulator 5.2, of electrical mixed voltage drops below a freely definable second threshold value. Correspondingly, the transistor 5.3 is switched by way of the gate 523 to be electrically non-conductive as soon as the electrical mixed voltage at the first input of the switching regulator 5.2 exceeds the first threshold value or as soon as the proportion, which is conducted through at the second input of the switching regulator 5.2, of electrical mixed voltage exceeds the second threshold value. The electrical mixed voltage applied to the first input of the switching regulator 5.2 or the conducted proportion of electrical mixed voltage applied at the second input of the switching regulator 5.2 is compared with the first and second threshold value by a respective comparator. Switching regulator 5.2 and transistor 5.3 form a controlled rectifier which rectifies the electrical mixed voltage without inductive load. The output of the transistor 5.3 is connected with at least one capacitor 5.4 by way of an electrical conductor 5.34. The capacitor 5.4 is electrically charged by the electrical current conducted through. The capacitor 5.4 thus stores electrical energy and delivers an electrical direct voltage 50. The electrical direct voltage 50 of the first electrical current supply 5 can be freely set in the range of 1.5 VDC to 50 VDC by way of at least one voltage divider 5.5.

Two embodiments of the sensor 6, 6' are explained hereinunder:

The door sensor 6 is attached in or to the building door 8. In accordance with FIG. 10, the door sensor 6 is at least one key 60, which is clearly visible to the user adjacent to the building door 8. The door sensor 6 detects that the key 60 has been actuated, for example, by means of an electro-mechanical contact, and generates at least one door sensor signal S. In accordance with FIG. 11, the door sensor 6 is integrated in the door trim and thus is not visible to users from the outside. The door sensor 6 detects that the door latch 61 has been moved by means of an electro-mechanical contact and generates at least one door sensor signal S. The door sensor signal S also indicates whether the building door 8 has been opened or closed from a side remote from at least one first electrical consumer 1 and/or whether the building door 8 has been opened or closed from a side facing the first electrical consumer 1.

A possible door sensor 6 is a motion detector which is disposed in the door frame of the building door 8 or in a building wall in the proximity of the building door 8. Likewise, a load-detecting mat can be used as the door sensor 6. In this case, any opening of the building door 8 is associated with the motion detector detecting movement or with the load-detecting mat detecting load on it. Accordingly, any closing of the building door 8 is associated with the absence of any movement being detected by the motion detector or with the absence of any load being detected by the load-detecting mat. It is also possible to combine a plurality of door sensors 6 together and to generate accordingly combined control signals.

The identification sensor 6' is disposed in at least one terminal 9 in the building G. The identification sensor 6' detects the identity of at least one user. In the embodiment of an identification sensor in accordance with FIG. 12 the identification sensor corresponds to the stationary request input device 90 and comprises at least one key pad. The user identifies himself/herself, for example, manually, by inputting an identification code as a number sequence on the key pad. In the embodiment of an identification sensor in accordance with FIG. 13, at least one stationary detection device 92 is disposed in the casing of the terminal 9. The identification sensor corresponds to the stationary detection device 92. The stationary detection device 92 receives at least one identification code from at least one mobile request input device 95 of the user.

The identification code which is input on the key pad or sent from the mobile request input device 95 is evaluated and an identification sensor signal S' is generated for a recognized identity of a user. A control device 7 and/or the stationary detection device 92 check the identity of the user. In accordance with FIGS. 5 and 6, the control device 7 checks the transmitted identification sensor signal S' in accordance with the method steps C4 and C5. In accordance with FIG. 7, the stationary detection device 92 checks the detected identification code. The transmitted identification sensor signal S' of the user or the detected identification code of the user are compared on both occasions against a list of users who have authorized access.

The door senor 6 and the identification sensor 6' and their arrangement can be combined. FIG. 15 shows, for example, a building door 8 disposed on the left on the floor levels S1, S2, S3, a combination and accordingly a common arrangement of door and identification sensor 6, 6'. For example, the user inputs an identification code via at least one key 60 and the door sensor 6 subsequently generates a door sensor signal S and the identification sensor 6' generates an identification sensor signal S'.

At least one control device 7 (FIG. 15) comprises at least one processor and at least one computer-readable data storage device. At least one computer program means is loaded from the computer-readable data storage device into the processor and implemented. The computer-program means controls the switching of an electrical consumer 1, 1', 1". The control device also generates at least one request, such as a floor level request or a destination request and transmits this via at least one signal line to the elevator control 17. The control device 7 can communicate with at least one remote control center 27 (FIG. 15) in a bi-directional manner via at least one network 41. The network 41 can be a radio network or a fixed network as described above. The remote control center 27 can be a remote maintenance control center which remotely performs maintenance and security work on the building G and on the elevator system A.

Figure 14:
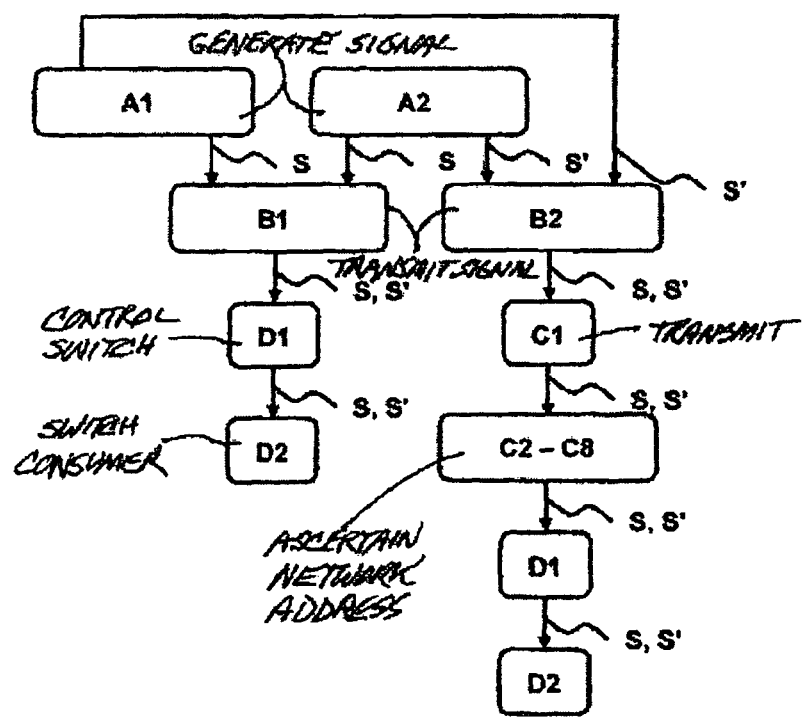
FIG. 14 shows a flow diagram indicating the method steps of the method for switching an electrical consumer in accordance with FIGS. 2 to 9 having a sensor in accordance with FIGS. 10 to. 13.

FIG. 14 shows a flow diagram with method steps of the method for switching electrical consumers 1, 1', 1" in the building G.

Figure 2:
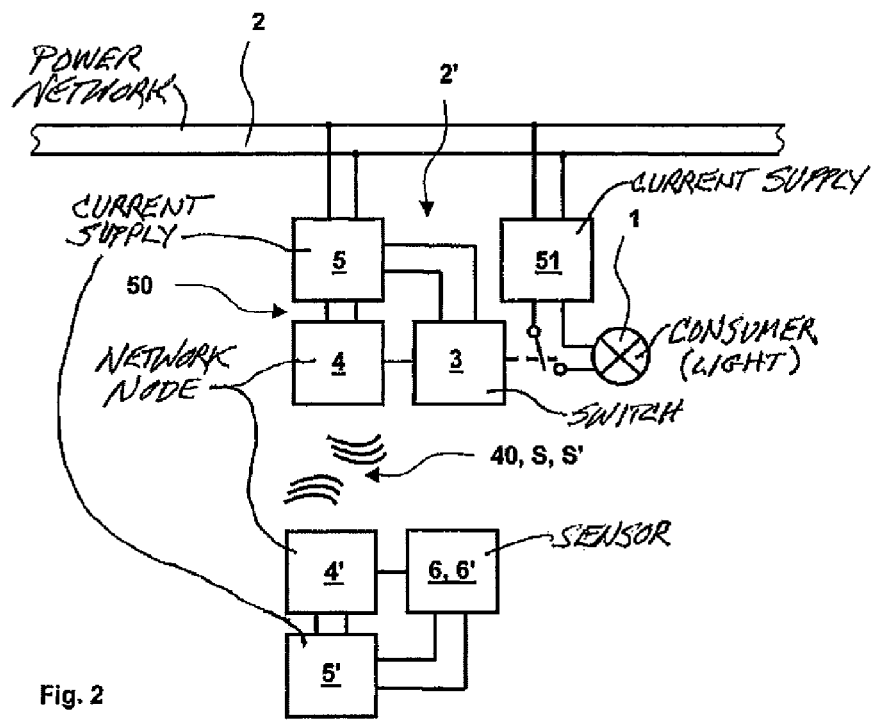
FIG. 2 shows a schematic illustration of a part of a first exemplified embodiment of the invention, where an electric lighting unit as an electrical consumer is switched.
Figure 4:
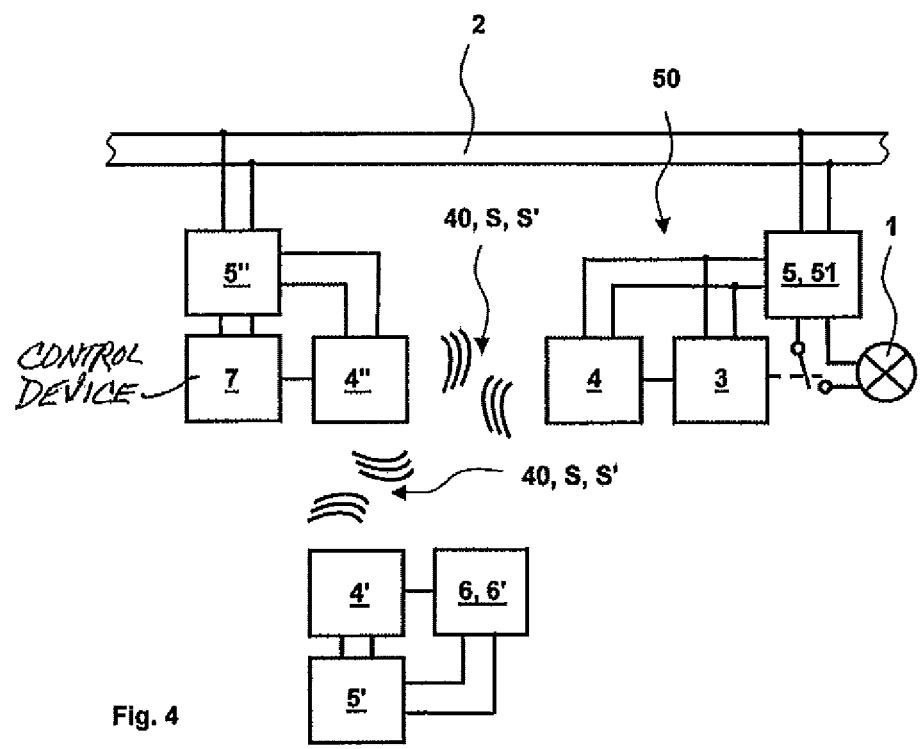
FIG. 4 shows a schematic illustration of a part of a third exemplified embodiment of the invention, where an electric lighting unit as an electrical consumer is switched.
Figure 5:
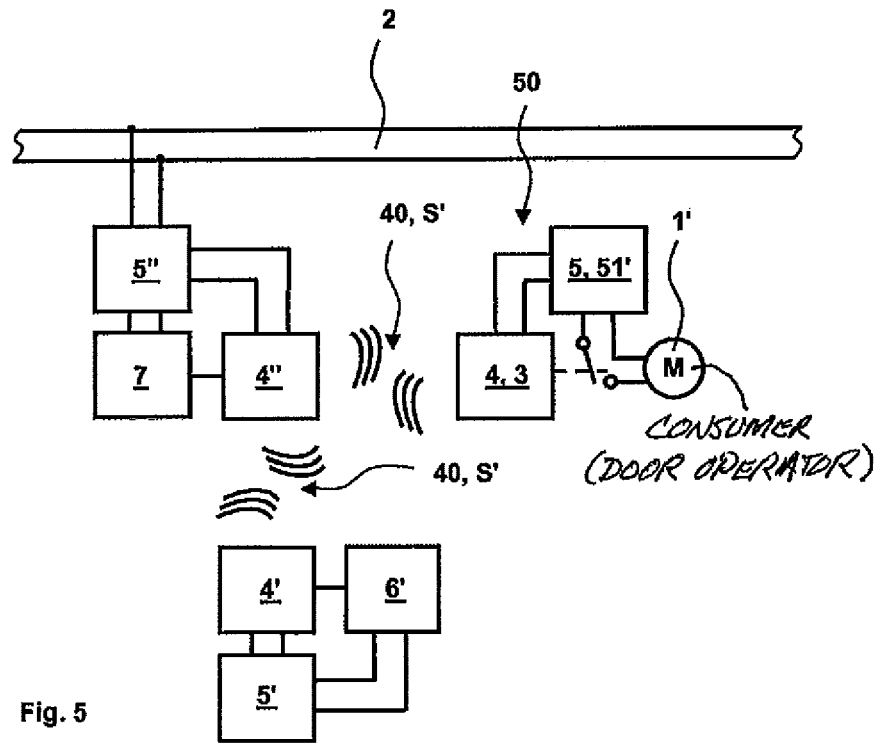
FIG. 5 shows a schematic illustration of a part of a fourth exemplified embodiment of the invention, where a door opening mechanism as an electrical consumer is switched.
Figure 6:
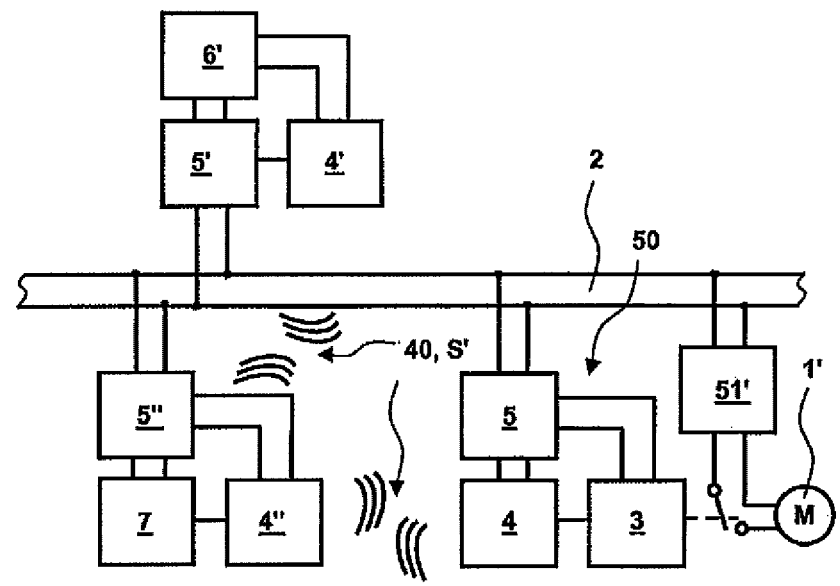
FIG. 6 shows a schematic illustration of a part of a fifth exemplified embodiment of the invention, where a door opening mechanism as an electrical consumer is switched.

In the method step A1, the door sensor 6 generates at least one door sensor signal S and transmits it to the second network node 4' (for example, FIG. 2, FIG. 4). In the method step A2, the identification sensor 6' generates at least one identification sensor signal S' and transmits it to the second network node 4'.

In the method step B1, the second network node 4' transmits a transmitted control signal S, S' to a first network node 4. In the method step B2, the second network node 4' transmits a transmitted control signal S, S' to the third network node 4"(for example FIG. 4). In the method step C1, the third network node 4" transmits a transmitted control signal S, S' to the control device 7. In the method steps C2 to C8, the control device 7 ascertains for a transmitted control signal S, S' a network address of a first network node 4 of at least one electrical consumer 1, 1', 1". Subsequently the third network node 4" transmits a control signal S, S' to the first network node 4 ascertained in this manner. In the method step D1, the first network node 4 controls the switch 3 by means of the control signal S, S'. In method step D2, the switch 3 switches the electrical consumer 1, 1', 1" by means of the control signal S, S'.

The first control signal S indicates "ON" if a building door 8 is opened or closed from a side remote from the first electrical consumer 1; the first control signal S indicates "OFF" or "DIM", if a building door 8 is opened or closed from a side facing the first electrical consumer 1. The switching on and off procedure can be implemented with a freely variable delay.

Figure 3:
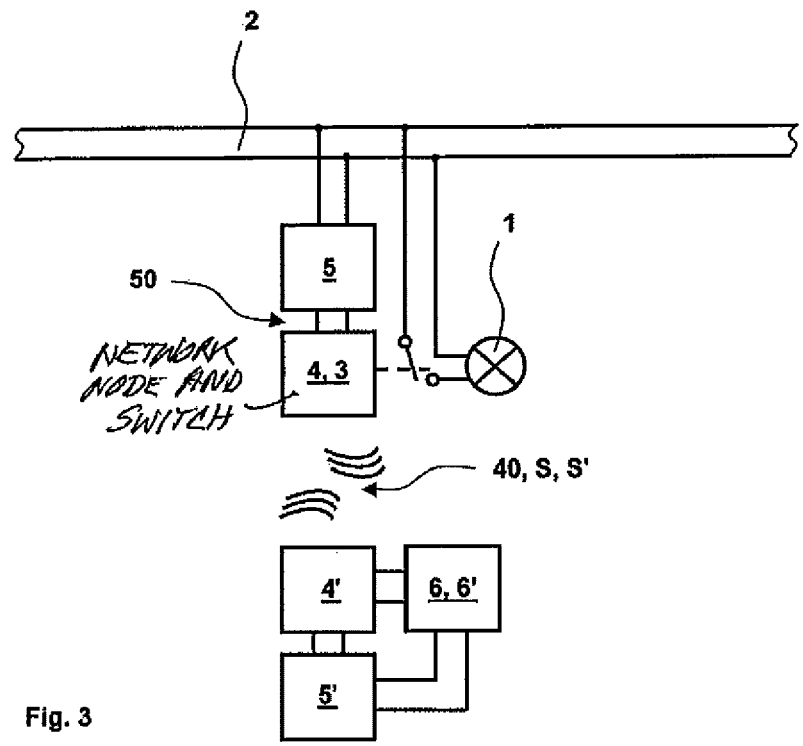
FIG. 3 shows a schematic illustration of a part of a second exemplified embodiment of the invention, where an electric lighting unit as an electrical consumer is switched.
Figure 7:
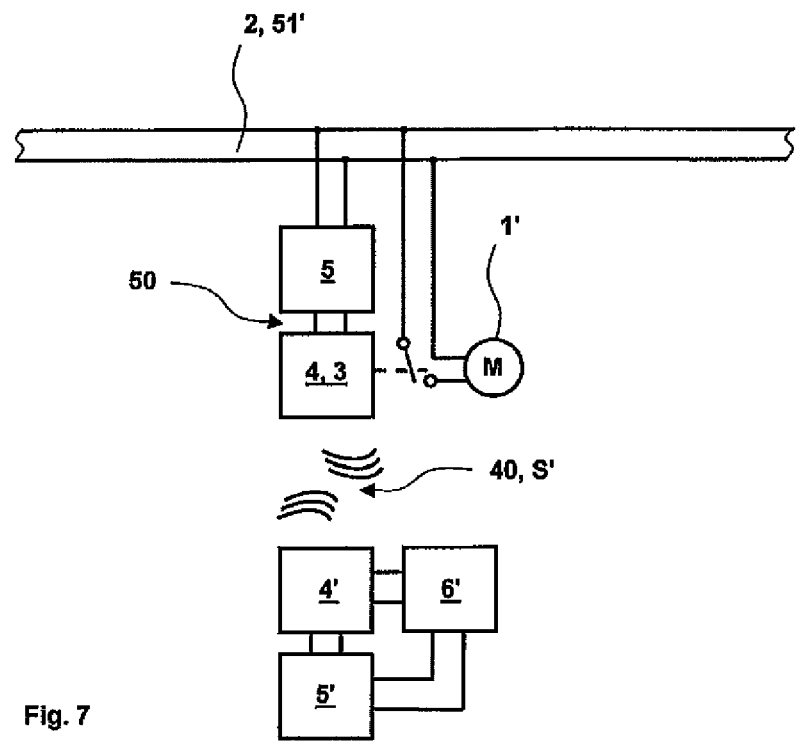
FIG. 7 shows a schematic illustration of a part of a sixth exemplified embodiment of the invention, where a door opening mechanism as an electrical consumer is switched.
Figure 8:
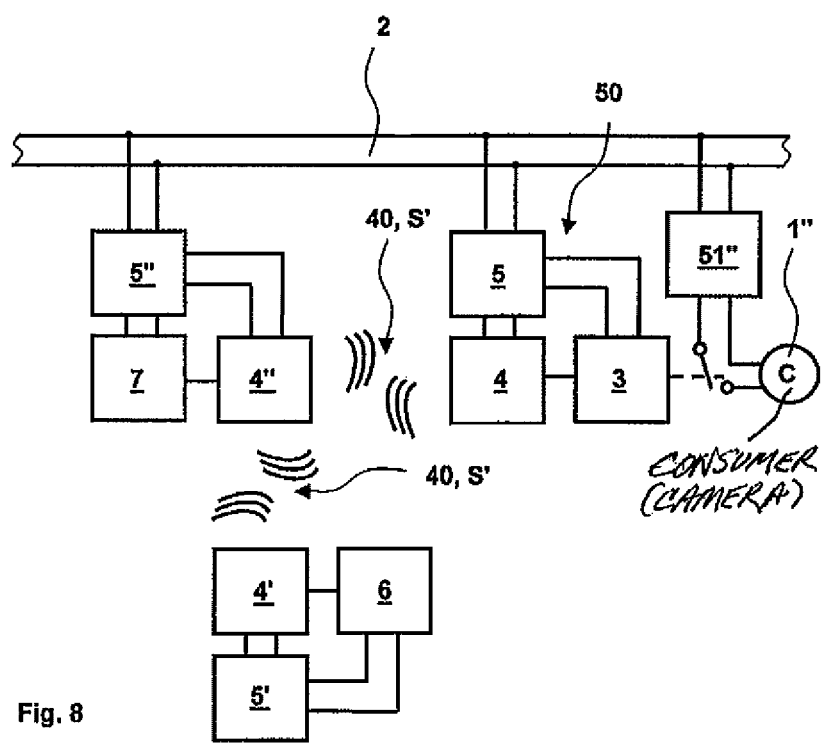
FIG. 8 shows a schematic illustration of a part of a seventh exemplified embodiment of the invention, where a camera as an electrical consumer is switched.
Figure 9:
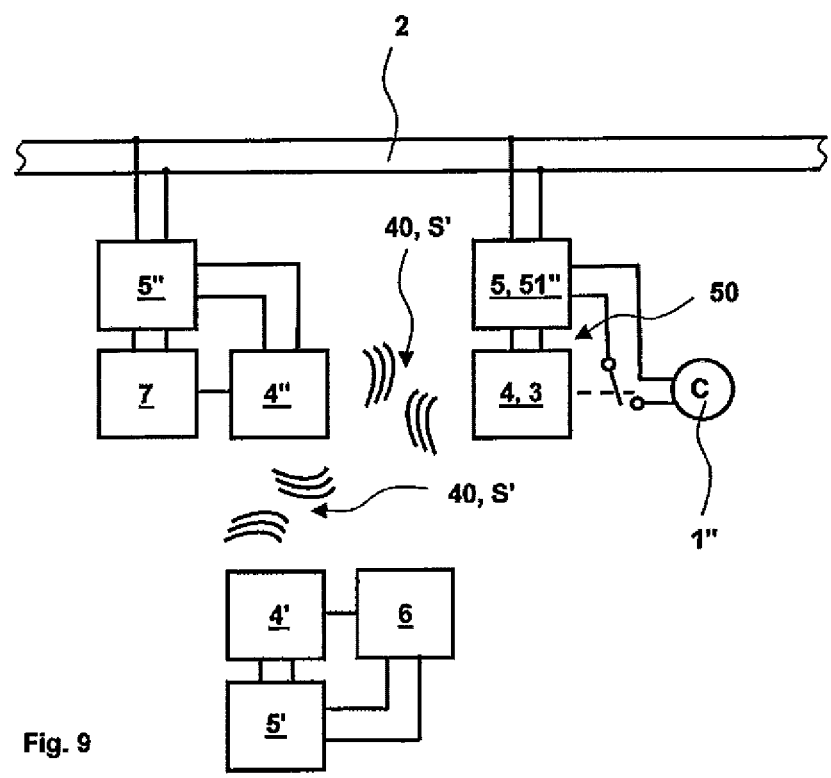
FIG. 9 shows a schematic illustration of a part of an eighth exemplified embodiment of the invention, where a camera as an electrical consumer is switched.

In accordance with FIGS. 2, 3 and 7, the control signal S, S' is transmitted by the sensor 6, 6' directly to the first network 4 which controls the electrical consumer 1, 1', 1". In accordance with FIGS. 4, 5, 8 and 9, the control signal S, S' is transmitted by the sensor 6, 6' indirectly and by switching on the control device 7 to the first network node 4 which controls the electrical consumer 1, 1', 1". The control device 7 performs at least one of the following method steps C2 to C8:

Method step C2: The control device 7 ascertains for a transmitted door sensor signal S at least one first electrical consumer 1 in the embodiment of an electric lighting unit. The control device 7 ascertains for the ascertained electric lighting unit a network address of a first network node 4. The control device 7 transmits the transmitted door sensor signal S and the ascertained network address of the first network node 4 to the third network node 4". The third network node 4" transmits the door sensor signal S to the ascertained network address of the first network node 4.

Method step C3: At least one destination signal which designates a building door 8 is generated for a transmitted door sensor signal S. The control device 7 ascertains for a generated destination signal at least one first electrical consumer 1 in the embodiment of an electric lighting unit. The control device 7 also ascertains at least one electric lighting unit on the route from the door sensor 6 which generates the door sensor signal S to the building door 8 which has been designated by the destination signal. The control device 7 ascertains for the ascertained electric lighting unit a network address of a first network node 4. The control device 7 transmits the generated door sensor signal S and the transmitted network address of the first network node 4 to the third network node 4". The third network node 4" transmits the generated door sensor signal S to the transmitted network address of the first network node 4.

Method step C4: The control device 7 checks at least one access authorization of a user to a building area for a transmitted identification sensor signal S'. In the event that there is no authorized access for the user to a building area for a transmitted identification sensor signal S', the control device 7 generates an alarm signal, which if necessary is combined with a position indicator of the identification sensor 6', and the alarm signal is transmitted, for example, to the control center 27.

In the event that the user has authorized access to a building area for a transmitted identification sensor signal S', the control device 7 ascertains at least one second electrical consumer 1' in the embodiment of a door opening mechanism. The control device 7 ascertains for the ascertained door opening mechanism a network address of a first network node 4. The control device 7 transmits the door sensor signal S and the ascertained network address of the first network node 4 to the third network node 4". The third network node 4" transmits the door sensor signal S to the ascertained network address of the first network node 4.

Method step C5: A transmitted identification sensor signal S' is checked as described above in method step C4. In the event that the user has authorized access to a building area for a transmitted identification sensor signal S', the control device 7 ascertains at least one first electrical consumer 1 in the embodiment of an electric lighting unit in the building area. The control device 7 ascertains for the ascertained electric lighting unit a network address of a first network node 4. The control device 7 transmits the identification sensor signal S' and the ascertained network address of the first network node 4 to the third network node 4". The third network node 4" transmits the identification sensor signal S to the ascertained network address of the first network node 4.

Method step C6: The control device 7 generates for a transmitted identification sensor signal S' at least one destination request signal which designates a destination floor level. The control device 7 transmits the destination request signal to the elevator control 17 and the user is transported in at least one elevator cabin 12 in accordance with this destination request signal to the destination floor level. The control device 7 ascertains at least one first electrical consumer 1 in the embodiment of an electric lighting unit on the destination floor level. The control device 7 generates for the ascertained electric lighting unit at least one control signal S and ascertains a network address of a first network node 4. The control device 7 transmits the generated control signal S and the ascertained network address of the first network node 4 to the third network node 4". The third network node 4" transmits the generated control signal S to the ascertained network address of the first network node 4.

Method step C7: The control device 7 generates for a transmitted identification sensor signal S' at least one destination signal which designates a building door 8. The control device 7 ascertains for a generated destination signal at least one first electrical consumer 1 in the embodiment of an electric lighting unit. The control device 7 ascertains for a transmitted identification sensor signal S and a generated destination signal at least one electric lighting unit on the route from the identification sensor 6' which generates the identification sensor signal S' to the building door 8 which is designated by the destination signal. The control device 7 generates for the ascertained electric lighting unit at least one control signal S and ascertains a network address of a first network node 4. The control device 7 transmits the generated control signal S and the ascertained network address of the first network node 4 to the third network node 4". The third network node 4" transmits the generated control signal S to the ascertained network address of the first network node 4.

Method step C8: The control device 7 generates for a transmitted identification sensor signal S' at least one destination signal which designates at least one building door 8. The control device 7 ascertains at least one route time from the identification sensor 6', which generates the identification sensor signal S, to the building door 8 which is designated by the destination signal. The control device 7 checks whether a door sensor signal S of a door sensor 6 of the building door 8 designated by the destination signal is transmitted prior to the route time expiring. In the event that such a door sensor signal S is not transmitted, the control device 7 ascertains at least one third electrical consumer 1" in the embodiment of a camera on the route from the identification sensor 6' which generates the identification sensor signal S' to the building door 8 designated by the destination signal. The control device 7 generates at least one activation signal for the ascertained camera and ascertains a network address of a first network node 4. The control device 7 transmits the generated activation signal S'and the ascertained network address of the first network node 4 to the third network node 4". The third network node 4" transmits the generated activation signal S' to the ascertained network address of the first network node 4. The first network node 4 controls the switch 3 of the camera to "ON" by virtue of the activation signal S'. The camera records at least one image of the route from the identification sensor 6', which generates the identification sensor signal S', to the building door 8 which is designated by the destination signal. The camera transmits the image to the first network node 4. The first network node 4 transmits the transmitted image to the third network node 4". The third network node 4" transmits the transmitted image to the control device 7. The control device 7 transmits the transmitted image and a position indicator of the third electrical consumer 1" via the network 41 to the control center 27. The control center 27 displays the image on a screen and evaluates it. The evaluation procedure consists, for example, of examining whether the user for whom the identification sensor signal S'has been generated can be recognized in the image. This can be by comparison of the image with a reference image which includes the user. This comparison can be performed automatically by virtue of a corresponding computer program means and/or by means of a technician. In the event that the user can be recognized in the image and in the event that the user is obviously in a dangerous situation, at least one alarm signal is generated. A dangerous situation exists, for example, if the user is lying or sitting motionless on the floor. The alarm signal and the position indicator of the third electrical consumer 1" are transmitted to a building security system, for example, as a telephone call or multimedia messaging service (MMS) with the transmitted image attached. The building security system can clarify the dangerous situation on site and assign at least one security officer. For example, a security officer goes personally to the location indicated by the position indicator of the third electrical consumer 1" and searches for the user. In the event that he/she finds the user, the security officer tends to the needs of the user.

The method can be amended or supplemented such that the camera or the first network node 4 of the camera or the third network node 4" of the control device 7 transmit the transmitted image and the position indicator of the third electrical consumer 1" to the remote control center 27.

Individual aspects of the above embodiments can be summarized as follows: a method is provided for switching at least one electrical consumer 1, 1', 1" in a building G with an elevator system. The switched consumer 1" is, for example, a camera. The camera is activated, in particular, if when using the elevator system the user does not actuate a building door 8 within an ascertained route time, i.e. the user has not arrived at his/her destination. It is possible using an image recorded by the camera to establish whether the user is possibly in a dangerous situation.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method performed by a control device comprising:
   using an identification sensor, generating an identification sensor signal identifying a user and a destination signal;
   determining a starting point for a route for the user through a building;
   determining from the destination signal the route and an end point for the route at a building door of the building;
   determining a route time for travelling from the starting point for the route to the end point for the route;
   determining that a sensor signal for the building door was not received before an expiration of the route time;
   as a result of determining that the sensor signal for the building door was not received before the expiration of the route time, activating by the control device an electrical consumer positioned along the route, the electrical consumer comprising a camera;
   recording an image of a portion of the route using the camera;
   analyzing the recorded image; and
   determining whether the user is in a dangerous situation.

2. The method of claim 1, further comprising sending the recorded image to a control center.

3. The method of claim 1, further comprising sending an alarm signal and position information for the camera to a control center or to a building security system.

4. The method of claim 1, the sensor signal for the building door comprising an indication that the building door has been opened.

5. The method of claim 4, the sensor signal for the building door indicating a direction in which the building door has been opened.

6. The method of claim 1, further comprising:
   determining from the destination signal a destination floor in the building for the identified user; and sending the destination signal to an elevator control unit.

7. The method of claim 1, the sensor signal for the building door being provided by a door sensor for the building door.

8. The method of claim 1, the electrical consumer being positioned on a portion of the route between an elevator and the building door.

9. A non-transitory computer-readable storage medium having encoded thereon instructions that, when executed by a processor, cause the processor to perform a method, the method comprising:
   using an identification sensor, generating an identification sensor signal identifying a user and a destination signal;
   determining a starting point for a route for the user through a building;
   determining from the destination signal the route and an end point for the route at a building door of the building;
   determining a route time for travelling from the starting point for the route to the end point for the route;
   determining that a sensor signal for the building door was not received before an expiration of the route time;
   as a result of determining that the sensor signal for the building door was not received before the expiration of the route time, activating an electrical consumer positioned along the route, the electrical consumer comprising a camera;
   recording an image of a portion of the route using the camera;

analyzing the recorded image; and
determining whether the user is in a dangerous situation.

10. A system, comprising: an identification sensor;
a building door sensor for a building door in a building; an electrical consumer; and
a control device, the control device being programmed for,
using the identification sensor, generating an identification sensor signal identifying a user and a destination signal,
determining a starting point for a route for the user through the building,
determining from the destination signal the route and an end point for the route at the building door,
determining a route time for travelling from the starting point for the route to the end point for the route,
determining that a sensor signal from the building door sensor was not received before an expiration of the route time,
as a result of determining that the sensor signal from the building door was not received before the expiration of the route time, activating the electrical consumer, the electrical consumer being positioned along the route, the electrical consumer comprising a camera,
recording an image of a portion of the route using the camera,
analyzing the recorded image, and
determining whether the user is in a dangerous situation.

11. The system of claim 10, further comprising a control center coupled to the control device.

12. A control device, comprising: a processor; and
a non-transitory computer-readable storage medium having encoded thereon instructions that, when executed by the processor, cause the processor to perform by,
using an identification sensor, generating an identification sensor signal identifying a user and a destination signal,
determining a starting point for a route for the user through a building,
determining from the destination signal the route and an end point for the route at a building door of the building,
determining a route time for travelling from the starting point for the route to the end point for the route,
determining that a sensor signal for the building door was not received before an expiration of the route time,
as a result of determining that the sensor signal for the building door was not received before the expiration of the route time, activating an electrical consumer positioned along the route, the electrical consumer comprising a camera,
recording an image of a portion of the route using the camera,
analyzing the recorded image, and
determining whether the user is in a dangerous situation.

13. A building, comprising: an identification sensor;
a building door;
a building door sensor for the building door; an electrical device; and
a control device, the control device being programmed to perform by,
using the identification sensor, generating an identification sensor signal identifying a user and a destination signal, determining a starting point for a route for the user through the building,
determining from the destination signal the route and an end point for the route at the building door,
determining a route time for travelling from the starting point for the route to the end point for the route,
determining that a sensor signal from the building door sensor was not received before an expiration of the route time,
as a result of determining that the sensor signal from the building door was not received before the expiration of the route time, activating the electrical consumer, the electrical consumer being positioned along the route, the electrical consumer comprising a camera,
recording an image of a portion of the route using the camera,
analyzing the recorded image, and
determining whether the user is in a dangerous situation.

14. The building of claim 13, further comprising an elevator installation.

15. The building of claim 14, the building comprising a first floor and a second floor, the control device:
determining from the destination signal a destination floor in the building for the identified user; and sending the destination signal to the elevator installation.

16. The building of claim 14, the building comprising a first floor and a second floor, the identification sensor being located on the first floor and the building door being located on the second floor.

* * * * *